(12) United States Patent
Baechle et al.

(10) Patent No.: US 6,193,031 B1
(45) Date of Patent: Feb. 27, 2001

(54) PROCESS FOR BLEEDING AN ANTI-SLIP, HYDRAULIC, TWIN-CIRCUIT BRAKING SYSTEM FOR MOTOR VEHICLES AND DEVICE FOR IMPLEMENTING IT

(75) Inventors: Martin Baechle, Glashütten; Hans-Ulrich Schiffer, Hattersheim; Stefan A. Schmitt, Johannesberg, all of (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/011,602

(22) PCT Filed: Jul. 24, 1996

(86) PCT No.: PCT/EP96/03261

§ 371 Date: Mar. 23, 1998

§ 102(e) Date: Mar. 23, 1998

(87) PCT Pub. No.: WO97/06042

PCT Pub. Date: Feb. 20, 1997

(30) Foreign Application Priority Data

Aug. 5, 1995 (DE) .............................................. 195 28 859

(51) Int. Cl.[7] .................................................. B60T 11/00
(52) U.S. Cl. ............................................................ 188/352
(58) Field of Search ....................... 188/352; 303/113.1, 303/113.2, 113.5, 115.4, 116.1, 119.1, 119.3

(56) References Cited

U.S. PATENT DOCUMENTS

| | | | |
|---|---|---|---|
| 4,174,615 | * | 11/1979 | Kuhn ..................................... 188/352 |
| 4,415,071 | * | 11/1983 | Butler et al. .......................... 188/352 |
| 4,418,803 | * | 12/1983 | Chichester ............................ 188/352 |
| 4,902,077 | * | 2/1990 | Belart et al. .......................... 188/352 |
| 4,946,230 | * | 8/1990 | Sakamoto et al. .................... 188/352 |
| 5,447,214 | * | 9/1995 | Applegren ............................. 188/352 |
| 5,605,384 | * | 2/1997 | Johnston et al. .................. 303/113.1 |

FOREIGN PATENT DOCUMENTS

| | | | |
|---|---|---|---|
| 2547501 | 4/1976 | (DE) . | |
| 2707286 | 9/1977 | (DE) . | |
| 2737572 | 2/1978 | (DE) . | |
| 3205411 | 2/1984 | (DE) . | |
| 3806840 | * 9/1989 | (DE) . | |
| 4326580 | 2/1995 | (DE) . | |
| 0342078 | 11/1989 | (EP) . | |
| 2-045246 | * 2/1990 | (JP) ..................................... 188/352 |
| 4-345566 | * 12/1992 | (JP) ..................................... 188/352 |

OTHER PUBLICATIONS

Bremsen–Handbuch, Autohaus–Verlag GmbH, Ottobrunn bei München, 1988, S.278–280.

* cited by examiner

Primary Examiner—Michael Mar
Assistant Examiner—Marlano Sy
(74) Attorney, Agent, or Firm—Rader, Fishman & Grauer PLLC

(57) ABSTRACT

The present invention relates to a process of bleeding and filling a slip-controlled hydraulic dual-circuit brake system for automotive vehicles which includes pressure modulation valves and at least one pump, a bleeding device and a filling device, and the bleeding device is connected to at least one bleeder valve of a wheel brake and the filling device is arranged on the braking pressure generator. Bleeding of the wheel brakes is executed in two sequences of operation: in a first sequence of operation, the wheel brakes of the front axle and the rear axle are pre-bled by a cyclic actuation of the braking pressure generator, and in the second sequence of operation the main bleeding and filling of the front-wheel and rear-wheel brakes is executed by actuating cycles of the braking pressure generator, the pressure modulation valves and start of operation of the pump.

6 Claims, 4 Drawing Sheets

PROCESS FOR BLEEDING AN ANTI-SLIP, HYDRAULIC, TWIN-CIRCUIT BRAKING SYSTEM FOR MOTOR VEHICLES AND DEVICE FOR IMPLEMENTING IT

BACKGROUND OF THE INVENTION

The present invention relates to a process of bleeding a slip-controlled dual-circuit brake system for automotive vehicles, and a device for implementing the process.

Slip-controlled automotive vehicle brake systems usually have an extensive system of bores for pressure-fluid conveying channels in a housing which render the filling and bleeding difficult. Frequently, high vacuum engineering is used, especially during the final assembly of the automotive vehicle on the assembly line. However, there are cases where the use of high vacuum engineering is impossible and the brake system must be filled and bled in a conventional scavenging process. This process entails considerable effort with respect to the single working steps required, because pre-bleeding, main-bleeding and after-bleeding phases are required during which the brake pedal in total must be operated by 200 strokes approximately.

Therefore, an object of the present invention is to develop a process of bleeding slip-controlled dual-circuit brake systems for automotive vehicles which is simple in application, to which end a device for implementing the bleeding process shall be presented which permits being used in the manufacture of vehicles and in workshops.

SUMMARY OF THE INVENTION

According to the present invention, this object is achieved by a process in which bleeding of the wheel brakes is executed in two sequences of operation: in a first sequence of operation, the wheel brakes of the front axle and the rear axle are pre-bled by a cyclic actuation of the braking pressure generator, and in the second sequence of operation the main bleeding and filling of the front-wheel and rear-wheel brakes is executed by actuating cycles of the braking pressure generator, the pressure modulation valves and start of operation of the pump. A device for carrying out the process includes a control device for activating the braking pressure generator, the pressure modulation valves and the pump, which is adapted to be linked in terms of circuitry to a diagnosis unit of the actuation and control electronics of the brake system.

Further details of the present invention will be explained in detail hereinbelow by way of an embodiment.

DETAILED DESCRIPTION OF THE DRAWINGS

Figure 1:
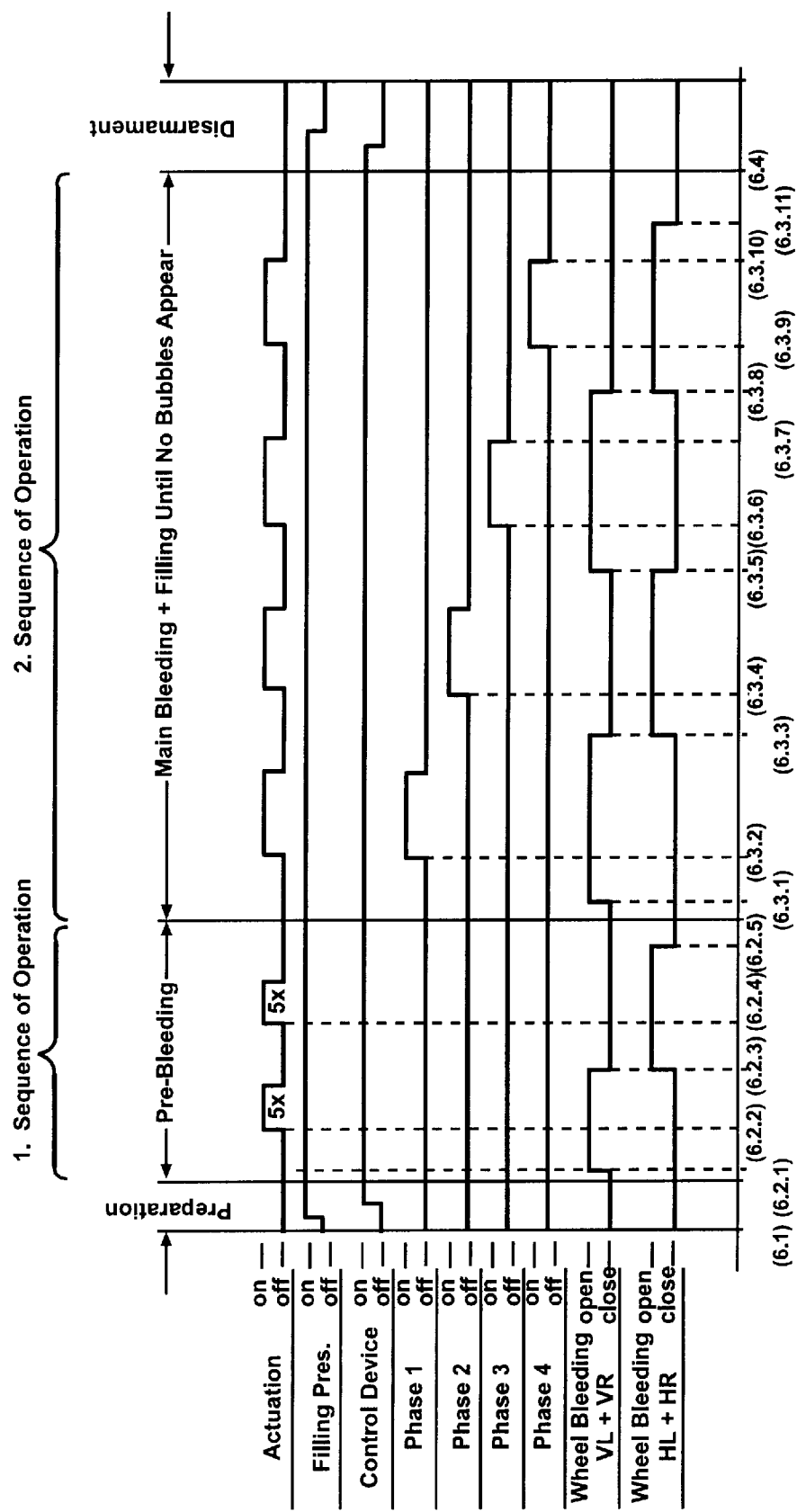
FIG. 1 is a total view of a sequence chart to describe the individual process steps during the bleeding operation.

FIG. 1 shows a total view of a sequence chart for bleeding and filling a dual-circuit brake system for automotive vehicles. To this end, the individual functional means required for the operational measures are plotted on the ordinate, and the necessary process steps are plotted on the abscissa. The total view of the sequence chart is subdivided into four operational fields, starting with the preparation (armament) of the automotive vehicle, followed by the first sequence of operation of pre-bleeding and the automated controlled main bleeding operation and the filling in the second sequence of operation and, finally, until the disarmament of the vehicle by removal of the required working materials.

Before the actual bleeding and filling process is described, it is assumed that a bleeding and filling device is connected to the braking pressure generator or, in a control operation, to the supply reservoir of the braking pressure generator. The filling pressure shall range between 0.7 and 1 bar. Further, the vehicle shall be equipped with a control device which preferably permits identifying the type of brake system by way of a diagnosis unit of the brake system actuation and control electronics. This control device shall permit selecting the respective program flow chart characteristic of the respective type of brake system, e.g. a dual-circuit brake system with anti-lock control, yaw torque control and traction slip control. To activate the braking pressure generator, it is favorable to use a pedal-actuating cylinder which, preferably, can also be actuated by the control device, so that manual operation is not required. With manual operation, a signal lamp will furnish instructions to the personnel for the correct brake pedal application as an alternative. The pedal-actuating cylinder shall be rated so that a pressure of roughly 50 to 60 bar is reached in the brake system when the bleeder valves on the wheel brakes are closed. After the bleeding hoses connected to the bleeding device are connected to the bleeder valves of the wheel brakes, one can proceed from the proper preparation of the vehicle for the purpose of bleeding and filling to the first sequence of operation of pre-filling, shown in FIG. 1, where a supplemental pressure fluid volume is already ensured by the filling pressure of the filling device which develops in the braking pressure generator.

Because the sequence chart shown in FIG. 1 relates to a dual-circuit diagonal brake system, initially, the bleeder valves of the front left and right wheel brake (VL, VR) are opened, while the bleeder valves or the rear left and right wheel brake (HL, HR) remain closed (see position 6.2.1).

The brake pedal must be fully depressed, either manually or by way of the pedal-actuating cylinder, maintained in the bottom most position for a short interval, and then released again. This action for actuation of the braking pressure generator is carried out five times in the proposed case of application. However, it is of no importance whether the fluid escaping from the bleeder valves of the front left and right wheel brakes (VL, VR) is without bubbles (see position 6.2.2). Subsequently, the bleeder valves of the front left and right wheel brakes (VL, VR) must be closed again, and the bleeder valves of the rear left and right wheel brakes (HL, HR) must be opened (see position 6.2.3). The brake pedal must be depressed once again, maintained in the bottom most position for a short period and then released again. Preferably, this action is repeated five times, irrespective of whether the fluid leaving the bleeder valves of the rear left and right wheel brakes (HL, HR) is devoid of bubbles (see position 6.2.4 of the sequence chart). The position 6.2.5 shows the bleeder valves of the rear left and right wheel brakes (HL, HR) in their closed position again.

Thus, the first sequence of operation for pre-bleeding all wheel brakes is completed, and main bleeding of the wheel brakes follows in the second sequence of operation with the assistance of a control device for activating the braking pressure generator, the pressure modulation valves and the pump, according to a program flow chart characteristic of the respective brake system type. To this end, the control device is connected in terms of circuitry to a diagnosis unit of the actuation and control electronics of the brake system in order to identify the type of brake system by way of an evaluating electronics integrated in the control device. Preferably, the individual operations of the program flow chart are optically represented in a display of the control device, and the person in charge of bleeding and filling the brake system follows a menu and is given specific instructions how to act by the display of the control device. The braking pressure generator can be actuated by the person in charge instructed by the control device. A signal lamp is appropriate therefor which flashes up when the pedal must be depressed and retained in position and which is extinguished when the pedal must be released. The bleeding and filling operation is further simplified when a pedal-actuating cylinder is used which can be operated directly by electric signals of the control device and which is suited to generate a hydraulic pressure of at least 50 bar in the brake system. When a pedal-actuating cylinder is used, main bleeding in the second sequence of operation of the process can be largely automated so that exclusively the bleeder valves on the wheel brakes must be operated manually.

The second sequence of operation of the bleeding and filling process is described in the following. To this end, the control device is active for four periods of main bleeding and filling in total, following a program flow chart which is characteristic of the respective type of brake system. In the present example of a diagonal circuit brake system, in the first working step the bleeder valves of the front left and right wheel brakes (VL, VR) are opened, and the other bleeder valves of the rear wheel brakes (HL, HR) remain closed. This corresponds to position 6.3.1 of the sequence chart. Subsequently, the program flow chart of the control device is started for a first phase simultaneously with the actuating cycles of the braking pressure generator. After expiry of the first phase, the control device switches to the standby mode. The bleeder valves of the front left and right wheel brakes (VRL, VR) are closed, and the bleeder valves of the rear left and right wheel brakes (HL, HR) are opened (see position 6.3.3 in FIG. 1). The second active phase of the control device follows where the program flow chart for bleeding and filling of the rear wheel brakes (HL, HR) is executed. After completion of phase 2, the control device switches to the standby mode again, and the front left and right bleeder valves of the wheel brakes (VL, VR) are reopened after the bleeder valves of the rear left and right wheel brakes (HL, HR) are closed (see position 6.3.5 in FIG. 1). Again follows an active phase (phase 3) of the control device where, similar to phase 1, the program flow chart is repeated for the front wheel brakes (VL, VR). This program flow chart of phase 3 must be repeated until the brake fluid leaving the open bleeder valves of the front left and right wheel brakes (VL, VR) is without bubbles (see position 6.3.6 in FIG. 1). Thereafter, the control device is stopped by hand, and the bleeding and filling phase (phase 3) is completed (see position 6.3.7). The bleeder valves of the front left and right wheel brakes (VL, VR) are closed, and the bleeder valves of the rear left and right wheel brakes (HL, HR) are opened for execution of phase 4 (see position 6.3.1). The program run for the bleeding and filling phase (phase 4) is initiated manually and executed until the brake fluid which leaves the bleeder valves of the rear wheel brakes (HL, HR) also appears without bubbles (see position 6.3.9). The control device is then switched off, and phase 4 is completed (see position 6.3.10). The bleeder valves of the rear left and right wheel brakes (HL, HR) are closed (position 6.3.11). It can be taken from FIG. 1 that during the entire four phases of operation of the control device the pedal actuation is active for four switching sequences until the brake fluid appearing at the individual bleeder valves is without bubbles. The program run of the control device for the individual phases 1–4 comprises in each case four switching sequences with five pedal strokes including a valve and pump motor circuitry assisting the bleeding. As has been mentioned hereinabove, the control device makes a distinction between slip-controlled brake systems equipped with anti-lock control and traction slip control. The program flow chart will vary in dependence on the scope of operation of the brake system. A number of program flow charts will be presented hereinbelow exemplarily which quasi correspond to a macro illustration of the individual phases 1–4 in FIG. 1.

Figure 2:
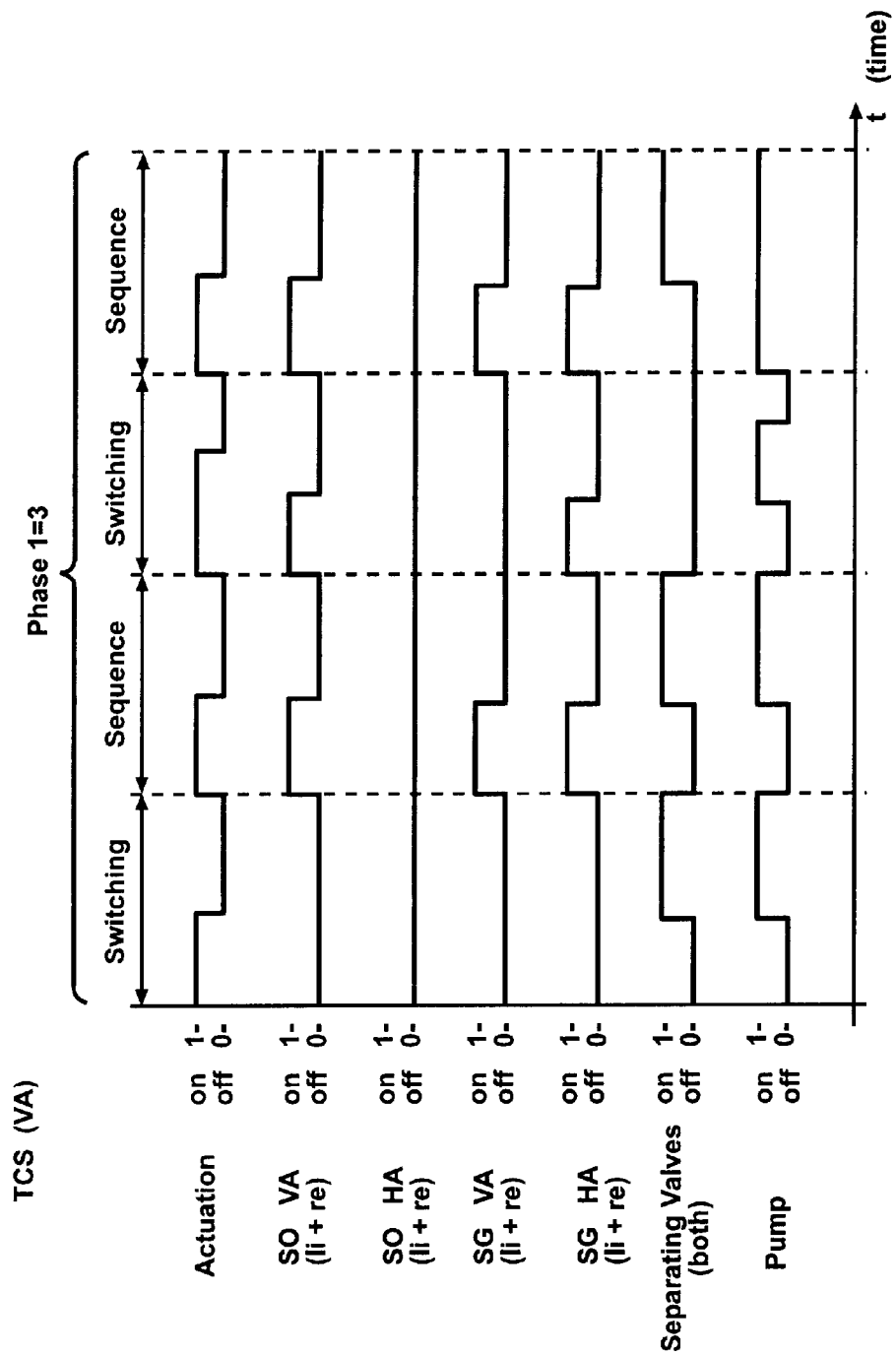
FIG. 2 is a view of the automated program flow chart during the first and the third bleeding and filling phase of the control device.

FIG. 2 shows as an example the phase 1 of the control device with several switching sequences of the actuation of the braking pressure generator and the switching sequences of the pressure modulation valves (SO=open when de-energized, SG=closed when de-energized) on the front and rear wheels (VA, HA) and the switching sequence of the pump plotted on the abscissa of the diagram. The abscissa represents the time axis. If the brake system to be bled and filled is an anti-lock system with traction slip control function, the actuating cycle for the separating valve must also be plotted as a function of the time axis. Normally, the separating valve is inserted in the brake line between the braking pressure generator and the pressure modulation valves (SO, SG) of the wheel brakes. In the present embodiment of FIG. 2, exclusively the program run of the control device for the necessary switching sequences on the traction-slip controlled front-wheel brakes will be shown. It can be taken from the embodiment of FIG. 2 that during the operation of the braking pressure generator in the second, third and fourth switching sequence each pressure modulation valve (SO, VA=front axle) associated with the front-wheel brakes (VL, VR) on the inlet side and the pressure modulation valves (SG, HA=rear axle) associated with the rear wheel brakes (HL, HR) on the outlet side are electromagnetically energized. The separating valves are temporarily energized electromagnetically during the switching sequences 1, 2 and 4, and the pump is temporarily in operation during all switching sequences. Thus, when closely reviewing the operations of individual functional components of the brake system over the switching sequences of the actuation of the braking pressure generator, the variation for the activity and inactivity of the individual functional elements against time can be determined. This entire program run in phase 1 of the control device is repeated in phase 3 of FIG. 1. The longest actuation of the braking pressure generator takes place in the fifth switching sequence, when the two pressure modulation valves (SO, VA) associated with the front-wheel brakes VA on the inlet side and the pressure modulation valves (SO, HA) associated with the rear-wheel brakes on the outlet side as well as the pressure modulation valves (SG, HA) associated with the rear-wheel brakes on the outlet side are energized, while the pump is in operation.

The phases 2 and 4 of the control device in FIG. 1 are illustrated as an example in FIG. 1 by way of the switching sequences for the anti-lock control operation on the rear axle. Each of the switching sequences comprises, exactly as in FIG. 2, one pedal stroke with a valve and pump operation assisting the bleeding. All pressure modulation valves and the pump remain inactively in their rest position in the first switching sequence. In the switching sequences 2–4, the pressure modulation valves (SO, HA) associated with the rear-wheel brakes on the inlet side will be energized electromagnetically to close, and the pressure modulation valves (SG, VA) associated with the front-wheel brakes on the outlet side are opened electromagnetically. In a comparison by way of the time axis (abscissa), this is done in a synchronous process during the five pedal strokes of a respective actuating cycle. The longest actuation of the braking pressure generator is in the fifth switching sequence when the two pressure modulation valves (SO, VA) associated with the front-wheel brakes VA on the inlet side and the pressure modulation valves (SO, HA) associated with the rear-wheel brakes on the inlet side are electromagnetically energized. Also, the pressure modulation valves (SG, VA) associated with the front-wheel brakes on the outlet side are energized while the pump is in operation. The pump is increasingly active in its on-cycle starting with switching sequence 2 corresponding to the pulsed operation shown.

Figure 3:
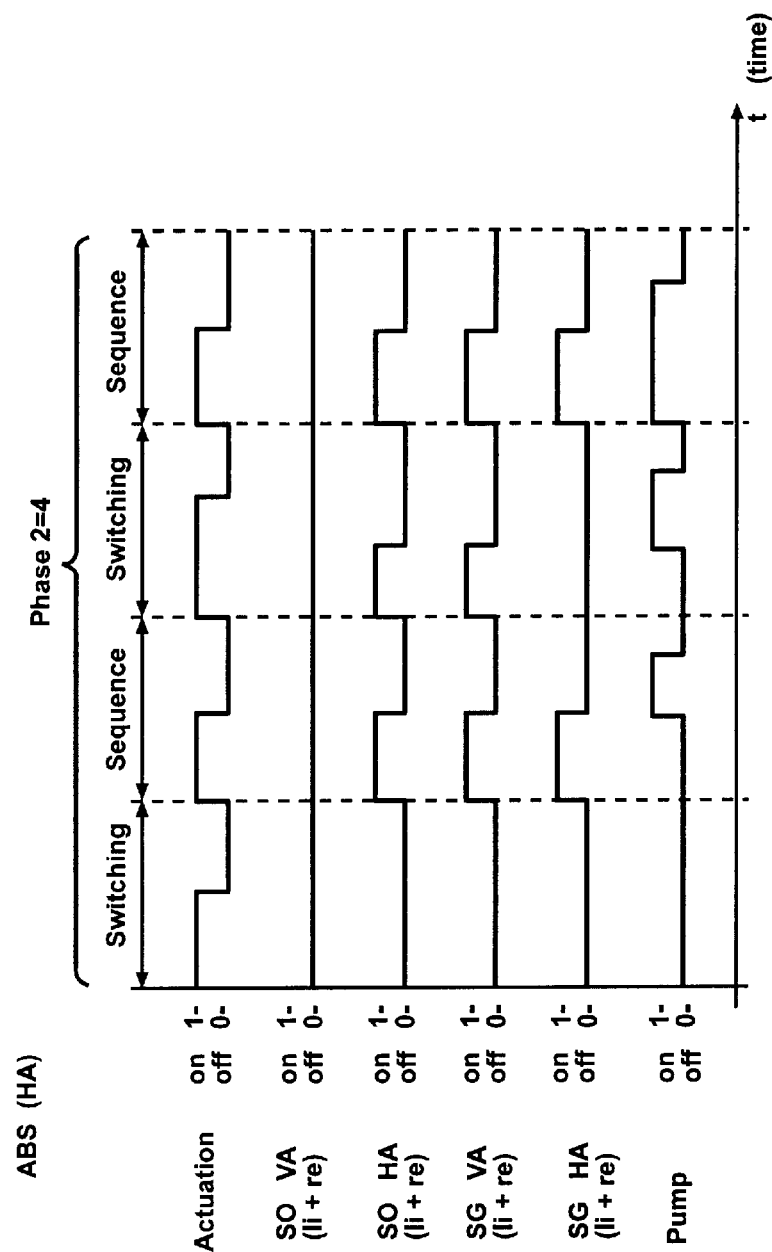
FIG. 3 is a view of the automated program flow chart for the bleeding and filling phases 2 and 4 shown in FIG. 1.
Figure 4:
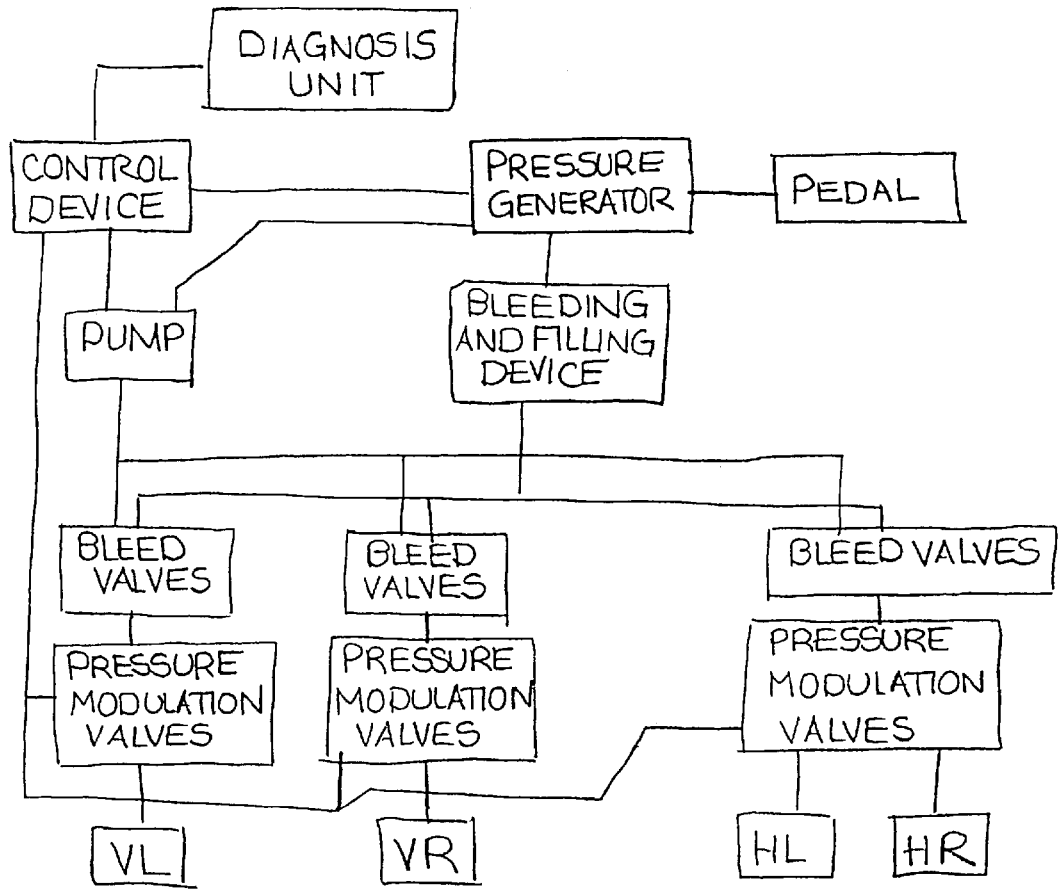
FIG. 4 is a schematic diagram of an embodiment of the present invention that illustrates various components thereof.

The switching sequences shown as an example in FIG. 2 and FIG. 3 must be repeated, if necessary, in phases 3 and 4 of the sequence chart of FIG. 1 if the brake fluid does not leave the bleeder valves of the rear-wheel and front-wheel brakes without bubbles. After termination of the program flow chart relating to phases 3 and 4, the control device, possibly the pedal-actuating cylinder, and the bleeding and filling device will be separated from the brake system. Thus, the entire bleeding and filling of the brake system along with a subsequent disarmament of the vehicle is completed after a period of about 20 minutes.

LIST OF REFERENCE NUMERALS

VL front left wheel brake
VR front right wheel brake
HL rear left wheel brake
HR rear right wheel brake
SO inlet-side pressure modulation valve
SG outlet-side pressure modulation valve
HA rear-wheel brake
VA front-wheel brake

What is claimed is:

1. Process of bleeding and filling a slip-controlled, hydraulic dual-circuit brake system for automotive vehicles with front axle and rear axle wheel brakes, which brake system includes a pressure generator, pressure modulation valves, and at least one pump, a bleeding device and a filling device connected to the dual-circuit brake system to implement the process, and the bleeding device is connected to at least one bleeder valve of a wheel brake, and the filling device for the filling with fluid is arranged on the braking pressure generator, wherein bleeding of the wheel brakes is executed in two sequences of operation: in the first sequence of operation, the wheel brakes of the front axle and the rear axle are pre-bled on associated wheel-brake-side bleeder valves exclusively by a small number of actuating cycles of the braking pressure generator irrespective of bubble-free condition of the fluid, and wherein in the second sequence of operation a bubble-free main bleeding and filling of the front-wheel and rear-wheel brakes is executed by several actuating cycles of braking pressure generator, during which, in recurrent phases of main bleeding and filling of the dual-circuit system, the pressure modulation valves and the pump are clockwise operated, and the pump operation represents a time maximum at the end of a series of actuations of the braking pressure generator.

2. Process as claimed in claim 1,
wherein for pre-bleeding in the first sequence of operation, initially, one wheel brake of each brake circuit has a connection to the bleeding device by the opening of its associated bleeder valve, and wherein the braking pressure generator and the wheel brakes being bled are pre-bled in an actuating cycle of several pedal strokes of a brake pedal, with the bleeder valves of the other wheel brakes of both brake circuits closed.

3. Process as claimed in claim 2,
wherein for pre-bleeding in the first sequence of operation, the open bleeder valves are closed when the first actuating cycle is completed, and the closed bleeder valves of the other wheel brakes of each one brake circuit are opened, whereupon the braking pressure generator is actuated by another actuating cycle of several pedal strokes.

4. Process as claimed in claim 1,
wherein for the main bleeding and filling operation in the second sequence of operation, the bleeder valves of one wheel brake of each brake circuit are opened, and the braking pressure generator is actuated in several consecutive actuating cycles, and several pedal strokes are performed during each of the subsequent actuating cycles.

5. Process as claimed in claim 4,
wherein the open bleeder valves are closed upon completion of the consecutive actuating cycles, and the bleeder valves of the other wheel brakes of each one brake circuit are opened, whereupon several pedal strokes are performed during each of the subsequent actuating cycles of the braking pressure generator.

6. Process as claimed in claim 4,
wherein the second sequence of operation for the main bleeding and filling of the wheel brakes of each brake circuit with pressure fluid is repeated until the pressure fluid leaving the bleeder valves is without bubbles.

* * * * *